United States Patent
Matityahu et al.

(10) Patent No.: US 8,755,293 B2
(45) Date of Patent: Jun. 17, 2014

(54) TIME MACHINE DEVICE AND METHODS THEREOF

(75) Inventors: Eldad Matityahu, Palo Alto, CA (US); Robert Shaw, Los Gatos, CA (US); Dennis Carpio, San Jose, CA (US); Randy Fung, San Jose, CA (US)

(73) Assignee: Net Optics, Inc., Santa Clara, CA (US)

( * ) Notice: Subject to any disclaimer, the term of this patent is extended or adjusted under 35 U.S.C. 154(b) by 161 days.

(21) Appl. No.: 13/070,086

(22) Filed: Mar. 23, 2011

(65) Prior Publication Data

US 2011/0211473 A1    Sep. 1, 2011

Related U.S. Application Data

(63) Continuation-in-part of application No. 13/034,730, filed on Feb. 25, 2011.

(60) Provisional application No. 61/308,981, filed on Feb. 28, 2010.

(51) Int. Cl.
  *H04L 12/26* (2006.01)

(52) U.S. Cl.
  USPC ........................................... 370/252; 370/390

(58) Field of Classification Search
  USPC .......... 370/252, 253, 389, 392, 235, 231, 390
  See application file for complete search history.

(56) References Cited

U.S. PATENT DOCUMENTS

| | | |
|---|---|---|
| 4,802,161 A | 1/1989 | Byars et al. |
| 5,173,794 A | 12/1992 | Cheung et al. |
| 5,539,727 A | 7/1996 | Kramarczyk et al. |
| 5,550,802 A | 8/1996 | Worsley et al. |
| 5,648,965 A | 7/1997 | Thadani et al. |
| 5,696,859 A | 12/1997 | Onaka et al. |
| 5,710,846 A | 1/1998 | Wayman et al. |

(Continued)

FOREIGN PATENT DOCUMENTS

| | | |
|---|---|---|
| JP | 2001-197066 A | 7/2001 |
| KE | 2006-148686 A | 6/2006 |

(Continued)

OTHER PUBLICATIONS

"Written Opinion", Issued in PCT Application No. PCT/US2006/25436, Mailing Date: Mar. 4, 2008.

(Continued)

*Primary Examiner* — Brian D Nguyen
(74) *Attorney, Agent, or Firm* — IPSG, P.C., Intellectual Property Law (57) ABSTRACT

A time machine arrangement for performing health check on a network environment is provided. The arrangement includes a set of network ports that that is configured for receiving and outputting network data traffic. The arrangement also includes a monitoring port for receiving at least a portion of the data traffic flowing through the network. The arrangement further includes a set of processors configured at least for managing and analyzing the data traffic. The set of processors includes a scheduler component for directing the data traffic, a filtering component for applying a set of filters on the set data traffic, an encryption component for encrypting the data traffic, and a trigger component for defining a set of conditions for storing the data traffic. The arrangement yet also includes a storage memory component for storing a copy of at least the portion of the data traffic flowing through the network environment.

15 Claims, 10 Drawing Sheets

(56) References Cited

U.S. PATENT DOCUMENTS

| | | | |
|---|---|---|---|
| 5,774,453 A | 6/1998 | Fukano et al. | |
| 5,781,318 A | 7/1998 | Tremblay | |
| 5,825,775 A | 10/1998 | Chin et al. | |
| 5,983,308 A | 11/1999 | Kerstein | |
| 6,041,037 A | 3/2000 | Nishio et al. | |
| 6,047,321 A | 4/2000 | Raab et al. | |
| 6,108,310 A | 8/2000 | Wilkinson et al. | |
| 6,167,025 A | 12/2000 | Hsing et al. | |
| 6,239,579 B1 | 5/2001 | Dunn et al. | |
| 6,272,136 B1 | 8/2001 | Lin et al. | |
| 6,366,557 B1 | 4/2002 | Hunter | |
| 6,424,627 B1 | 7/2002 | Sorhaug et al. | |
| 6,449,247 B1 | 9/2002 | Manzardo et al. | |
| 6,542,145 B1 | 4/2003 | Resisinger et al. | |
| 6,650,803 B1 | 11/2003 | Ramaswami et al. | |
| 6,658,565 B1 | 12/2003 | Gupta et al. | |
| 6,687,009 B2 | 2/2004 | Hui et al. | |
| 6,687,847 B1 | 2/2004 | Aguilera et al. | |
| 6,714,976 B1 | 3/2004 | Wilson et al. | |
| 6,798,740 B1 | 9/2004 | Senevirathne et al. | |
| 6,801,940 B1 | 10/2004 | Moran et al. | |
| 6,823,383 B2 | 11/2004 | MacBride | |
| 6,841,985 B1 | 1/2005 | Fetzer | |
| 6,850,706 B2 | 2/2005 | Jager et al. | |
| 6,882,654 B1 | 4/2005 | Nelson | |
| 6,898,630 B2 | 5/2005 | Ueno et al. | |
| 6,898,632 B2 | 5/2005 | Gordy et al. | |
| 6,925,052 B1 | 8/2005 | Reynolds et al. | |
| 6,944,437 B2 | 9/2005 | Yang et al. | |
| 6,975,209 B2 | 12/2005 | Gromov | |
| 7,027,437 B1 | 4/2006 | Merchant et al. | |
| 7,061,942 B2* | 6/2006 | Noronha et al. | 370/537 |
| 7,171,504 B2 | 1/2007 | Ishii | |
| 7,277,957 B2 | 10/2007 | Rowley et al. | |
| 7,284,055 B1* | 10/2007 | Oehrke et al. | 709/226 |
| 7,308,705 B2 | 12/2007 | Gordy et al. | |
| 7,321,565 B2 | 1/2008 | Todd et al. | |
| 7,324,553 B1 | 1/2008 | Varier et al. | |
| 7,415,013 B1 | 8/2008 | Lo | |
| 7,430,354 B2 | 9/2008 | Williams | |
| 7,477,611 B2 | 1/2009 | Huff | |
| 7,486,624 B2 | 2/2009 | Shaw et al. | |
| 7,486,625 B2 | 2/2009 | Matityahu et al. | |
| 7,505,416 B2 | 3/2009 | Gordy et al. | |
| 7,616,587 B1 | 11/2009 | Lo et al. | |
| 7,627,029 B2 | 12/2009 | Ho et al. | |
| 7,760,859 B2 | 7/2010 | Matityahu et al. | |
| 7,773,529 B2 | 8/2010 | Matityahu et al. | |
| 8,077,049 B2* | 12/2011 | Yaney et al. | 340/660 |
| 2001/0040870 A1 | 11/2001 | Ohmori et al. | |
| 2002/0003592 A1 | 1/2002 | Hett et al. | |
| 2002/0026374 A1 | 2/2002 | Moneymaker et al. | |
| 2002/0032880 A1 | 3/2002 | Poletto et al. | |
| 2002/0073199 A1 | 6/2002 | Levine et al. | |
| 2002/0087710 A1 | 7/2002 | Aiken et al. | |
| 2002/0146016 A1 | 10/2002 | Liu et al. | |
| 2002/0176355 A1 | 11/2002 | Mimms et al. | |
| 2002/0180592 A1 | 12/2002 | Gromov | |
| 2003/0112760 A1 | 6/2003 | Puppa et al. | |
| 2003/0142666 A1 | 7/2003 | Bonney et al. | |
| 2003/0184386 A1 | 10/2003 | Varner et al. | |
| 2003/0215236 A1 | 11/2003 | Manifold | |
| 2004/0008675 A1 | 1/2004 | Basso et al. | |
| 2004/0023651 A1 | 2/2004 | Gollnick et al. | |
| 2004/0062556 A1 | 4/2004 | Kubo et al. | |
| 2004/0096227 A1 | 5/2004 | Bulow | |
| 2004/0109411 A1 | 6/2004 | Martin | |
| 2004/0120259 A1 | 6/2004 | Jones et al. | |
| 2004/0128380 A1 | 7/2004 | Chen et al. | |
| 2004/0190547 A1 | 9/2004 | Gordy et al. | |
| 2004/0202164 A1 | 10/2004 | Hooper et al. | |
| 2004/0215832 A1 | 10/2004 | Gordy et al. | |
| 2004/0264494 A1 | 12/2004 | Kim | |
| 2005/0005031 A1 | 1/2005 | Gordy et al. | |
| 2005/0060535 A1 | 3/2005 | Bartas | |
| 2005/0071711 A1 | 3/2005 | Shaw | |
| 2005/0108444 A1 | 5/2005 | Flauaus et al. | |
| 2005/0122910 A1 | 6/2005 | Parupudi et al. | |
| 2005/0129033 A1 | 6/2005 | Gordy et al. | |
| 2005/0132051 A1 | 6/2005 | Hill et al. | |
| 2005/0231367 A1 | 10/2005 | Bellantoni | |
| 2005/0257262 A1 | 11/2005 | Matityahu et al. | |
| 2005/0271065 A1* | 12/2005 | Gallatin et al. | 370/401 |
| 2005/0278565 A1 | 12/2005 | Frattura et al. | |
| 2006/0083268 A1 | 4/2006 | Holaday et al. | |
| 2006/0083511 A1 | 4/2006 | Edmunds et al. | |
| 2006/0153092 A1 | 7/2006 | Matityahu et al. | |
| 2006/0200711 A1 | 9/2006 | Schondelmayer et al. | |
| 2006/0215566 A1 | 9/2006 | Walsh | |
| 2006/0233115 A1 | 10/2006 | Matityahu et al. | |
| 2006/0282529 A1 | 12/2006 | Nordin | |
| 2007/0002754 A1 | 1/2007 | Matityahu et al. | |
| 2007/0002755 A1 | 1/2007 | Matityahu et al. | |
| 2007/0002769 A1 | 1/2007 | Matityahu et al. | |
| 2007/0064917 A1 | 3/2007 | Matityahu et al. | |
| 2007/0081549 A1 | 4/2007 | Cicchetti et al. | |
| 2007/0081553 A1 | 4/2007 | Cicchetti et al. | |
| 2007/0121499 A1* | 5/2007 | Pal et al. | 370/230 |
| 2007/0140398 A1* | 6/2007 | Inoue et al. | 375/372 |
| 2007/0171966 A1 | 7/2007 | Light et al. | |
| 2007/0174492 A1 | 7/2007 | Light et al. | |
| 2007/0211682 A1 | 9/2007 | Kim et al. | |
| 2007/0213862 A1 | 9/2007 | Chang et al. | |
| 2007/0218874 A1* | 9/2007 | Sinha et al. | 455/411 |
| 2008/0014879 A1 | 1/2008 | Light et al. | |
| 2008/0049627 A1 | 2/2008 | Nordin | |
| 2008/0168283 A1 | 7/2008 | Penning | |
| 2008/0214108 A1 | 9/2008 | Beigne et al. | |
| 2009/0040932 A1 | 2/2009 | Matityahu et al. | |
| 2009/0041051 A1 | 2/2009 | Matityahu et al. | |
| 2009/0178144 A1* | 7/2009 | Redlich et al. | 726/27 |
| 2009/0210649 A1* | 8/2009 | Wan et al. | 711/170 |
| 2010/0146113 A1 | 6/2010 | Matityahu et al. | |
| 2010/0167713 A1* | 7/2010 | Hoffman | 455/418 |
| 2010/0183298 A1 | 7/2010 | Biegert et al. | |
| 2010/0195538 A1 | 8/2010 | Merkey et al. | |
| 2010/0247068 A1 | 9/2010 | Howarter et al. | |
| 2010/0254310 A1* | 10/2010 | Kats et al. | 370/328 |
| 2011/0161544 A1* | 6/2011 | Chengson et al. | 710/305 |

FOREIGN PATENT DOCUMENTS

| | | |
|---|---|---|
| KR | 10-2004-0058415 A | 7/2004 |
| WO | WO-02/19642 A1 | 3/2002 |
| WO | WO-2004/012163 A2 | 2/2004 |

OTHER PUBLICATIONS

"International Search Report", Issued in PCT Application No. PCT/US2006/25436, Mailing Date: Mar. 4, 2008.

"International Preliminary Report on Patentability", Application No. PCT/US06/25436, Mailing Date: May 22, 2008.

"Non Final Office Action", U.S. Appl. No. 11/223,477, Mailing Date: Jun. 12, 2008.

"Non Final Office Action", U.S. Appl. No. 11/174,033, Mailing Date: May 29, 2008.

"Final Office Action", U.S. Appl. No. 11/174,033, Mailing Date: Dec. 10, 2008.

"Non Final Office Action", U.S. Appl. No. 11/174,033, Mailing Date: Sep. 15, 2009.

"Final Office Action", U.S. Appl. No. 11/174,033, Mailing Date: Jun. 24, 2010.

"Non Final Office Action", U.S. Appl. No. 11/174,033, Mailing Date: Apr. 28, 2011.

"Non Final Office Action", U.S. Appl. No. 11/174,032, Mailing Date: Apr. 23, 2008.

"Inter Partes Reexamination Office Action", U.S. Appl. No. 95/001,318, Patent in Re-examination: 7,486,625, Mailing Date: Apr. 23, 2010.

"Replacement Statement and Explanation under 37CFR 1.915 In Support of Request for Inter Partes Reexamination of US Patent 7,486,625", Sonnenschein Nath & Rosenthal LLP, Jan. 22, 2010, 251 pages.

(56) References Cited

OTHER PUBLICATIONS

"Request for Inter Partes Reexamination of US Patent 7,486,625", Sonnenschein Nath & Rosenthal LLP, Dec. 18, 2009, 69 pages.
Non Final Office Action, U.S. Appl. No. 11/174,238, Mailing Date: Oct. 1, 2008.
"International Preliminary Report on Patentability", issued in PCT Application No. PCT/US2006/025437, Mailing Date: Jan. 17, 2008.
"International Search Report", Application No. PCT/US2006/25437, Mailing Date: Dec. 6, 2006.
"Written Opinion", Application No. PCT/US2006/25437, Mailing Date: Dec. 6, 2006.
"Non Final Office Action", U.S. Appl. No. 11/370,487, Mailing Date: Mar. 25, 2009.
"Non Final Office Action", U.S. Appl. No. 11/370,487, Mailing Date: Jun. 11, 2009.
"International Search Report", Issued in PCT Application No. PCT/US2008/072484, Mailing Date: Feb. 13, 2009.
"Written Opinion", Issued in PCT Application No. PCT/US2008/072484, Mailing Date: Feb. 13, 2009.
"International Preliminary Report on Patentability", Issued in PCT Application No. PCT/US2008/072484, Mailing Date: Feb. 18, 2010.
"Non Final Office Action", U.S. Appl. No. 11/835,228, Mailing Date: Sep. 9, 2010.
"International Search Report", Issued in PCT Application No. PCT/US2008/072493, Mailing Date: Feb. 13, 2009.
"Written Opinion", Issued in PCT Application No. PCT/US2008/072493, Mailing Date: Feb. 13, 2009.
"International Preliminary Report on Patentability", Issued in PCT Application No. PCT/US2008/072493, Mailing Date: Feb. 18, 2010.
"Non Final Office Action", U.S. Appl. No. 11/835,233, Mailing Date: Jun. 9, 2009.
"Final Office Action", U.S. Appl. No. 11/835,233, Mailing Date: Oct. 30, 2009.
"Non Final Office Action", U.S. Appl. No. 11/835,233, Mailing Date: Jun. 25, 2010.
"International Search Report", issued in PCT Application No. PCT/US2008/080598, Mailing Date: May 26, 2009.
"Written Opinion", Issued in PCT Application No. PCT/US2008/080598, Mailing Date: May 26, 2009.
"Notice of Allowance and Fees Due", U.S. Appl. No. 11/925,826, Mailing Date: Jun. 18, 2010.
"European Search Report", issued in EP Patent Application No. EP 08 17 1759, Mailing Date: Jul. 31, 2009.
"Notice of Allowance and Fee(s) Due", U.S. Appl. No. 11/965,668, Mailing Date: Oct. 8, 2009.
"Non Final Office Action", U.S. Appl. No. 12/705,195, Mailing Date: Dec. 27, 2010.
"Written Opinion", Issued in PCT Application No. PCT/US2010/037985, Mailing Date: Dec. 31, 2010.
"International Search Report", Issued in PCT Application No. PCT/US2010/037985, Mailing Date: Dec. 31, 2010.
"Non Final Office Action", U.S. Appl. No. 12/481,847, Mailing Date: Nov. 4, 2010.
"Final Office Action", U.S. Appl. No. 12/481,847, Mailing Date: Feb. 9, 2011.
"Non Final Office Action", U.S. Appl. No. 10/834,448, Mailing Date: Mar. 4, 2009.
"Final Office Action", U.S. Appl. No. 10/834,448, Mailing Date: Dec. 9, 2009.
"Non Final Office Action", U.S. Appl. No. 10/834,448, Mailing Date: Feb. 7, 2008.
"Non Final Office Action", U.S. Appl. No. 10/834,448, Mailing Date: Feb. 18, 2010.
"Final Office Action", U.S. Appl. No. 10/834,448, Mailing Date: Aug. 3, 2010.
"Final Office Action", U.S. Appl. No. 10/834,448, Mailing Date: Jun. 27, 2011.
"Non Final Office Action", U.S. Appl. No. 10/834,448, Mailing Date: Dec. 22, 2010.
"International Search Report", PCT Application No. PCT/US2011/026159, Mailing Date: Nov. 30, 2011.
"Written Opinion", PCT Application Number: PCT/US2011/026159, Mailing Date: Nov. 30, 2011.
Belkin International, Inc., "Belkin Quick Installation Guide", N1 Vision Wireless Router, Belkin International, Inc., Compton, CA, Feb. 11, 2009, 3 pages total.
Belkin International, Inc., "Network Status Display", Belkin International, Inc., Compton, CA, 2007, 1 page total.
HP, et al., "Reduced Gigabit Media Independent Interface (RGMII)", Nov. 30, 2005, http://web.archlve.org/web/20051113015000/http://www.hp.com/md/pdfs/RGMIIv2_0_final_hp.Pdf.
Wikipedia, "Field-programmable Gate Array", Jan. 21, 2005, http://web.archive.org/web/20050121193052/http://en.wi kiped ia.org/wiki/Field-programmable_gate_array.
Xilinx, "LogiCore OPB Ethernet Lite Media Access Controller", v1.01b, Mar. 3, 2006.
"Fast Ethernet Fiber-to-Fiber Converters", Canary Communications, Inc. 7 pages total, 2004.
"Sequence Reducer/ Sequence Mirror Operator's Guide", Peribit Networks, Inc. 13 pages total. 2001-2005.
"PeriScope Central Management System (CMS) 5.0 Administrator's Guide", Peribit Networks, Inc. 13 pages total. 2003-2004.
"VSS Coppertap Literature", VSS Monitoring Inc. 2 pages. 2003-2004.
"VSS Easy Install Guide", VSS Monitoring Inc. 8 pages total. 2003-2005.
"VSS Linksafe", VSS Monitoring Inc., 1 page. 2003-2005.
Anonymous, "100Base-TX/100BBase-FX Media Converters E-100BTX-FX-04 User's Guide", Transitions Networks, Minneapolis, MN, Copyright 1998-2000, 4 pages.
Gigamon Systems LLC, "GigaVUE—Product Brief", Gigamon Systems LLC, http:web.archive.org/web/20070815021951/www.gigamon.com/pdf/GigamonSystems-OnePageProductBrief.pdf, Aug. 15, 2007, 1 page.
"International Preliminary Report on Patentability", PCT Application No. PCT/US2011/026159, Mailing Date: Sep. 13, 2012.
"International Search Report", PCT Application No. PTC/US2012/030448; Mailing Date: Oct. 19, 2012.
"Written Opinion", PCT Application Number: PTC/US2012/030448; Maiiing Date: Oct. 19, 2012.
"Non Final Office Action", U.S. Appl. No. 13/034,730, Mailing Date: Dec. 6, 2012.
"Final Office Action", U.S. Appl. No. 13/034,730, Mailing Date: Jun. 5, 2013.

\* cited by examiner

FIG. 8

TIME MACHINE DEVICE AND METHODS THEREOF

PRIORITY CLAIM

This application is a continuation-in-part application and claims priority under 35 U.S.C. §120 to a commonly assigned application entitled "Gigabits Zero-Delay Tap and Methods Thereof," application Ser. No. 13/034,730, filed Feb. 25, 2011, by inventors Matityahu et al., which claims priority under 35 U.S.C. 119(e) to a commonly owned provisionally filed patent application entitled "Gigabits Zero-Delay Tap and Methods Thereof," U.S. Application No. 61/308,981, filed on Feb. 28, 2010, by inventors Matityahu et al., all of which is incorporated herein by reference.

CROSS REFERENCE TO RELATED APPLICATIONS

The present invention is related to the following applications, all of which are incorporated herein by reference:

Commonly assigned application entitled "Zero-Interrupt Network Tap," filed on Apr. 28, 2004, by Matityahu et al. (application Ser. No. 10/834,448), all of which are incorporated herein by reference.

BACKGROUND OF THE INVENTION

In today society, a company may depend upon its network to be fully functionally in order to conduct business. Thus, a company may monitor its network in order to ensure reliable performance, enable fault detection, and detect unauthorized activities. Monitoring may be performed by connecting network taps to the network to gather information about the data traffic in order to share the information with monitoring tools.

Figure 1:
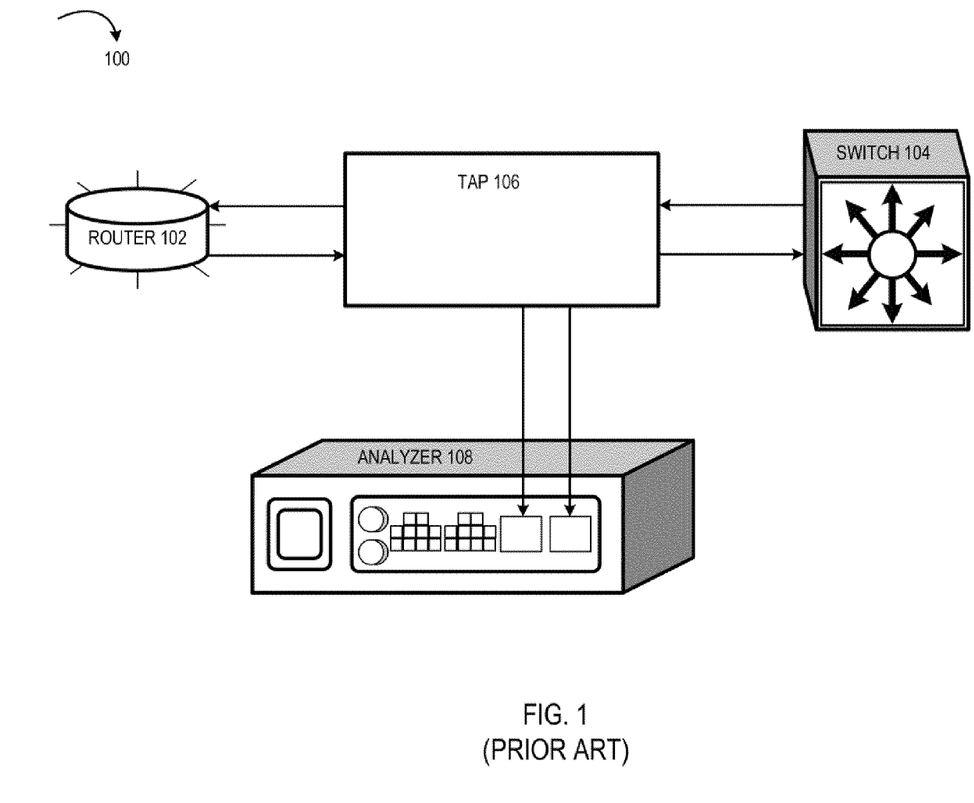
FIG. 1 shows a simple diagram of a network environment with a network tap.

To facilitate discussion, FIG. 1 shows a simple diagram of a network environment with a network tap. Consider the situation wherein, for example, a network environment 100 has two network devices (a router 102 and a switch 104). Data traffic may be flowing through the two network devices. To monitor the health of the network environment, a network tap 106 may be positioned between the two network devices in order to gather information about the data flowing between the two network devices. In an example, a data packet is received by router 102. Before the data packet is forwarded to switch 104, network tap 106 may make a copy of the data packet and forward the copied data packet to a monitoring device, such as an analyzer 108.

Since most network taps are configured as a bypass device, network tap 106 does not have storage capability. In other words, original data packets flow from router 102 to switch 104 via network tap 106. Further, data packets copied by network tap 106 are forwarded to one or more monitored devices. In both situations, a copy of the data packets being handled is not stored by network tap 106. Thus, if a problem arises in regard to the origin of a 'bad' data packet, network tap 106 is usually unable to provide useful information in resolving the problem.

Accordingly, an improved intelligent network tap for managing and/or storing the data packets flowing through the network environment is desirable.

BRIEF DESCRIPTION OF THE SEVERAL VIEWS OF THE DRAWINGS

The present invention is illustrated by way of example, and not by way of limitation, in the Figures of the accompanying drawings and in which like reference numerals refer to similar elements and in which.

DETAILED DESCRIPTION OF EMBODIMENTS

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the present invention, a time machine device is provided for storing and/or managing network traffic. Embodiments of the invention include arrangements and methods for establishing conditions for storing network traffic. Embodiments of the invention also include arrangements and methods for encrypting the network traffic. Embodiments of the invention further include arrangements and methods for distributing network traffic flow to minimize impact on line rate.

In this document, various implementations may be discussed using network tap as an example. This invention, however, is not limited to network tap and may include any network and/or security appliances (e.g., routers, switches, hubs, bridges, load balancer, firewalls, packet shaper, and the like). Instead, the discussions are meant as examples and the invention is not limited by the examples presented.

In an embodiment of the invention, a time machine device is provided for performing health check on a network environment. The time machine, in an embodiment, may be configured to capture data traffic and to store the data for analysis. In an embodiment, the time machine may include a pre-processing module, a set of processors, a storage memory component, and an export component.

In an embodiment, the time machine may employ the pre-processing module to perform preliminary analysis (e.g., aggregation, filtering, etc.) on the data flowing through the network devices. Preliminary analysis may be performed if certain conditions are met, in an example. For example, data packets coming from an IP address that is known for propagating viruses may be excluded. The pre-processing module is an optional module and is not required for the implementation of the invention.

The time machine, in an embodiment, may employ the set of processors to manage the data traffic. The number of processor that may be required may vary depending upon the amount of traffic flowing through the time machine and/or the type of analysis that is being performed on the data traffic. For example, for a company that has a high volume of data traffic, the time machine may be configured to have more processors than a company that has a fairly low volume of data traffic.

In an embodiment, the set of processors may include a scheduler component, a filtering component, an encryption component, and a trigger component. The scheduler component, in an embodiment, may be configured to direct data traffic, thereby enabling the scheduler component to redirect data traffic as needed. In an embodiment, the filtering component may include logic for performing filtering, including ingress filtering, egress filtering and/or deep packet inspection (DPI). Data flowing through the time machine may also be encrypted by the encryption component, in an embodiment, thereby minimizing the possibility of unapproved tapping. In an embodiment, the time machine may employ a trigger component to define the condition for storing a data packet.

The time machine, in an embodiment, may store the data packets using the storage memory component. The amount of memory available in the storage memory component may be configured to meet the user's needs. In an embodiment, the storage memory component may be an internal component that is integrated with the time machine. Additionally or alternatively, the storage memory component may be an external component, such as a set of external hard drives. In an embodiment, a memory controller may be employed to manage the storage memory component. The memory controller may be employed to control how the data is stored, where the data is stored, and how to redirect the data when one of the memory devices is not available.

In an embodiment, data traffic saved on the time machine may be exported and made available to other devices through the export component. In an example, the data may be exported to SATA-supported devices. In another example, the data may be exported through an Ethernet interface. In yet another example, the data may be exported to USB-type devices. With the export capability, data analysis may be performed off-site.

The features and advantages of the present invention may be better understood with reference to the figures and discussions that follow.

Figure 2A:
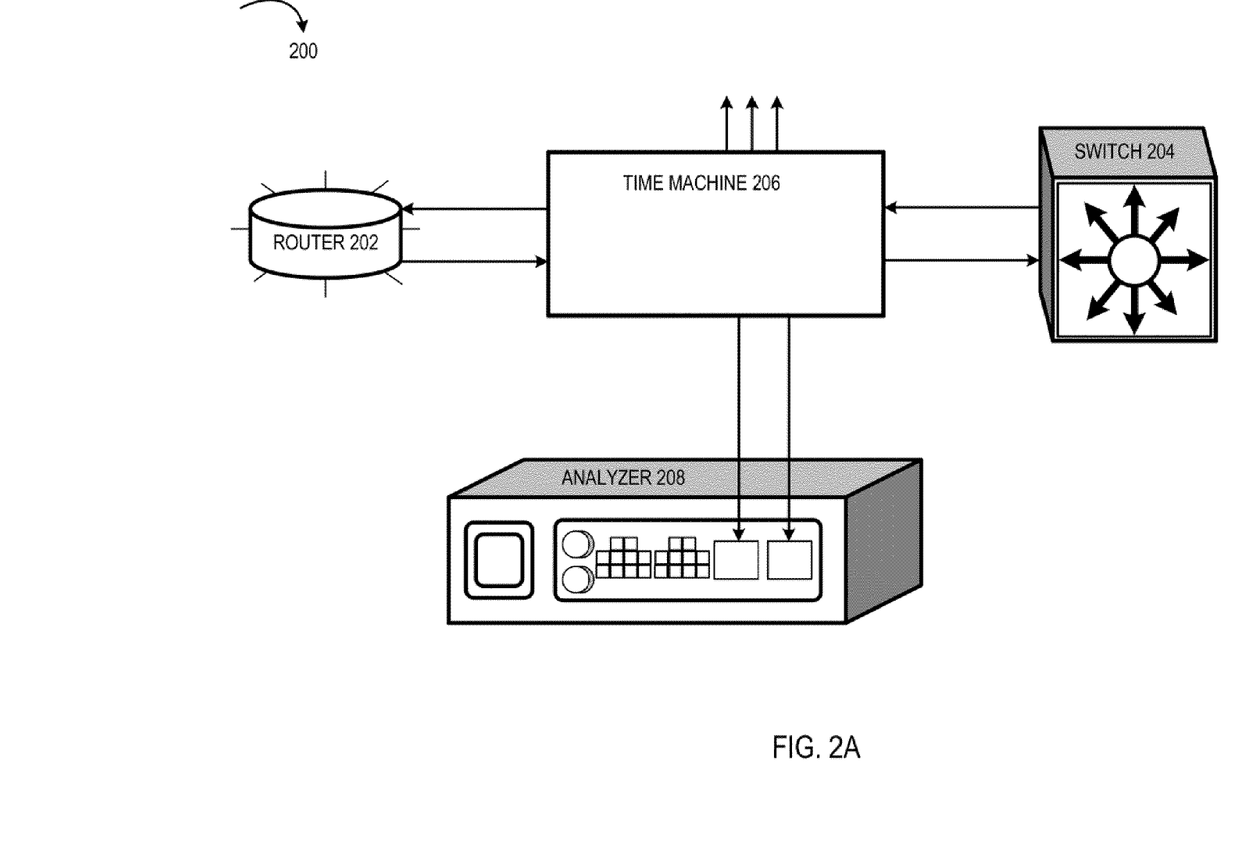
FIG. 2A shows, in an embodiment of the invention, a simple diagram of a network environment with a time machine device.
Figure 2B:
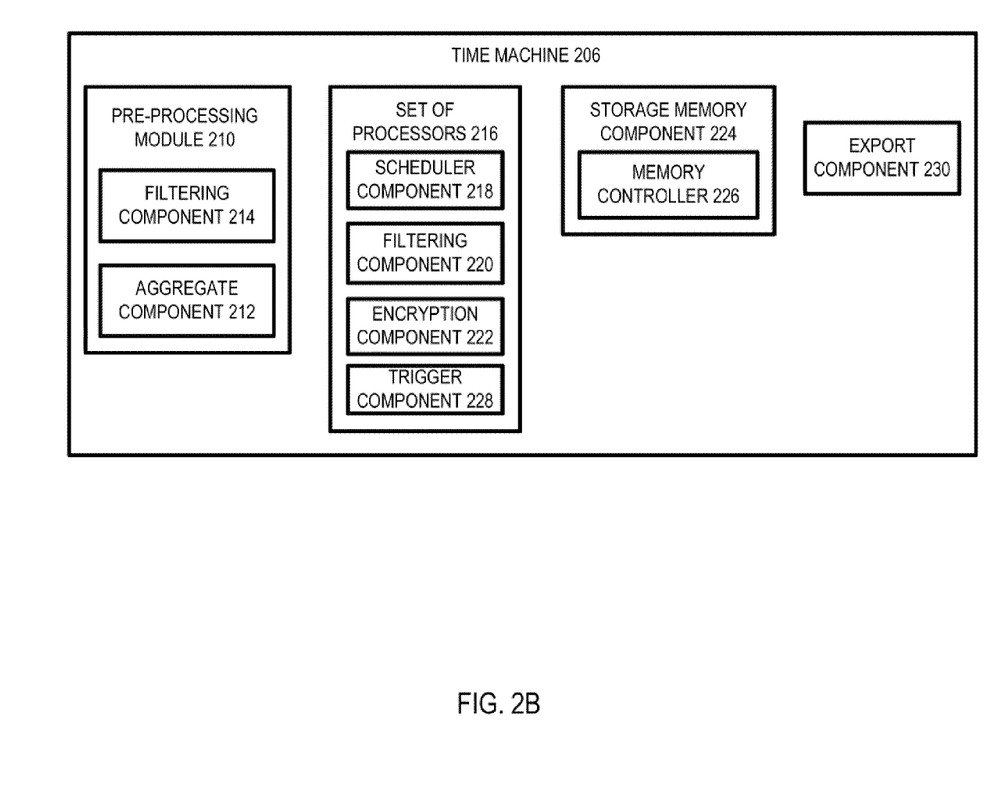
FIG. 2B shows, in an embodiment of the invention, a simple logical diagram of a time machine.

FIG. 2A shows, in an embodiment of the invention, a simple diagram of a network environment with a time machine device. FIG. 2A will be discussed in relation to FIG. 2B. FIG. 2B shows, in an embodiment of the invention, a simple logical diagram of a time machine. Consider the situation wherein, for example, a network environment 200 has two network devices (such as a router 202 and a switch 204). Although a router and switch are shown, the invention is not limited by the type of network devices. Instead, the network devices are provided as example only.

Data traffic may be flowing through the two network devices (router 202 and switch 204). In an embodiment, a time machine device 206 may be positioned between the two network devices (router 202 and switch 204). Time machine 206 may be configured to manage the data traffic flowing through the network environment and may include programmable logic for performing inline and/or span functions.

In an embodiment, time machine 206 may include a pre-processing module 210 that may include at least one of an aggregate component 212 and a filtering component 214. In an example, data (such as data packets) may be flowing through multiple ports. The data packets from the ports may be aggregated into a single data stream, for example, by aggregate component 212 of pre-processing module 210. In another example, simple filtering functionalities may be performed by filtering component 214 on the data stream before the data stream is sent for further processing. For example, an example of a filter may include dropping all data commencing from a specific internet address. As a result, time machine 206 may not only control the type of data that may be flowing to analyzer 208 but may also control the data flow traffic between the two network devices (such as router 202 and switch 204).

In an embodiment, pre-processing module 210 (such as a field-programmable gate array (FPGA)) may be configured to perform packet ordering and time stamp. As can be appreciated from the foregoing, no particular order is required in aggregating and/or filtering the data. Further, pre-processing module 210 is an optional module and is not required for the implementation of the invention.

In an embodiment, time machine 206 may include a set of processors 216. The set of processors may include one or more processors for handling the flow of data traffic through time machine 206. The number of processors that may be required may depend upon the amount of data traffic and/or the amount of processing that may be handled by time machine 206. In order to manage the flow of traffic, set of processors 216 may also include a scheduler component 218, which is configured to direct data traffic. In an example, scheduler component 218 may determine the percentage of data traffic that may be handled by each processor. In another example, scheduler component 218 may be configured to redirect data traffic to other processors when a processor is not working properly. By managing the data traffic with scheduler component 218, data being handled by set of processors 216 may be managed at or close to line rate.

In an embodiment, set of processors 216 may include a filtering component 220, which may be configured to perform filtering on the data traffic. In an embodiment, filtering component 220 may be configured to perform at least one of ingress filtering, egress filtering and/or deep packet inspection (DPI). As discussed herein, ingress filtering refers to a technique for verifying the origination of the data packets. This type of filtering is usually performed to protect the network from malicious senders. As discussed herein, egress filtering refers to a technique for restricting the flow of outbound data traffic if the data traffic fails a set of security policies. As discussed herein, deep packet inspection refers to a technique for analyzing the data for security and/or data mining purposes. As can be appreciated, other filtering techniques may be implemented and filtering component 220 is not limited to those discussed above.

In an embodiment, set of processors 216 may also include an encryption component 222, which may be employed to encrypt the data managed by time machine device 206. The invention is not limited by the type of encryption technique that may be employed. By encrypting the data, unapproved tapping may be preventing from listening to the data traffic that may be flowing through time machine device 206.

In an embodiment, encryption component 222 may be a configurable component. In an example, a user may have the option of determining whether or not the encryption component 222 is active. In an example, if a user wants to turn off the encryption function, the data packets flowing through time machine 216 are not encrypted. In another example, if the encryption function is turned on, then the data traffic is encrypted and only a key may be employed to decrypt the data traffic.

In an embodiment, time machine device 206 may be configured to capture the data traffic flowing between the two network devices. In an example, a data packet is received by router 202. Before the data packet is forwarded to switch 204, network tap 206 may make a copy of the data packet and forward the copied data packet to a monitoring device, such as an analyzer 208.

Unlike the prior art, all the data traffic is not automatically captured, copied and forwarded to a monitoring device (such as analyzer 208). Instead, filtering may be performed (via a set of processors 216 and/or pre-processing module 210) and only data packets that meet the criteria established for the monitoring device may be forwarded to the monitoring device. In an example, analyzer 208 is only interested in monitoring data packets related to emails. Thus, only email data packets are forwarded to analyzer 208. By sending only data packets that are relevant to analyzer 208, the path between time machine device 206 and analyzer 208 is not burdened by unnecessary traffic. Also, analyzer 208 does not have to perform additional processing to extract the data that is relevant to its analysis.

In the prior art, once the data packets have been forwarded to the monitoring device, the network tap does not usually maintain a copy of the data streams. Unlike the prior art, time machine device 206 includes a storage memory component. 224. In an embodiment, the storage memory component is a set of memory devices internally integrated with time machine device 206. In another embodiment, storage memory component 224 may be a set of external memory devices coupled to time machine device 206. In yet another embodiment, storage memory component 224 may be both a set of internal and external memory devices. The amount of memory required may vary depending upon a user's requirements.

In an embodiment, a memory controller 226 may be provided for managing storage memory component 224. In an example, storage memory component 224 may include four memory devices (e.g., RAID 5, RAID 0, etc.). After a time, the first memory device needs to be replaced. Memory controller 226 may be employed to redirect the flow of data to the other three memory devices while the first memory device is being replaced. Thus, disruption is minimized while part of the device is being repaired/replaced.

In an embodiment, data traffic that is copied by time machine device 206 may be stored within storage memory component 224. In an embodiment, a time stamp may be added to each data packets to establish an order sequence. Since most data traffic may not provide useful information after a period of time, most data traffic may be eliminated after a predefined period of time. In an embodiment, time machine device 206 may be configured to save incoming data packets over "old data" once storage memory component 224 has reached its maximum capacity.

However, some data packets may require a longer "saved" period. In an embodiment, a set of processors 216 may include a trigger component 228, which is a component that may define the conditions under which a set of data packets may be protected from being overwritten. In an embodiment, the conditions may be user-configurable. In an example, the user may define the conditions for protecting the set of data packets. For example, all emails from accounting are to be saved for six months. In another example, all emails from the president are to be kept indefinitely.

In an embodiment, data traffic from time machine device 206 may be exported to other media types instead of just to Ethernet-type media (such as analyzer 208). In an embodiment, an export component 230 may be configured to export data through a plurality of media types, including but not limited to, SATA, USB, and the like. By enabling the data traffic to be exported, data traffic may be monitored and/or analyzed off-site.

As aforementioned, time machine device 206 is configured for storing data packets. In an embodiment, the conditions for storing the data are user-configurable. In an example, all of the incoming data traffic is stored. In another example, only data packets that meet specific conditions are stored. Since the data packets are stored, time machine device 206 may include a playback feature that enable the user to analyze the data stored and statistical data relating to the data to be analyzed. The playback feature may enable analysis to be performed at a later date and may be employed to address problems that may arise.

Figure 3:
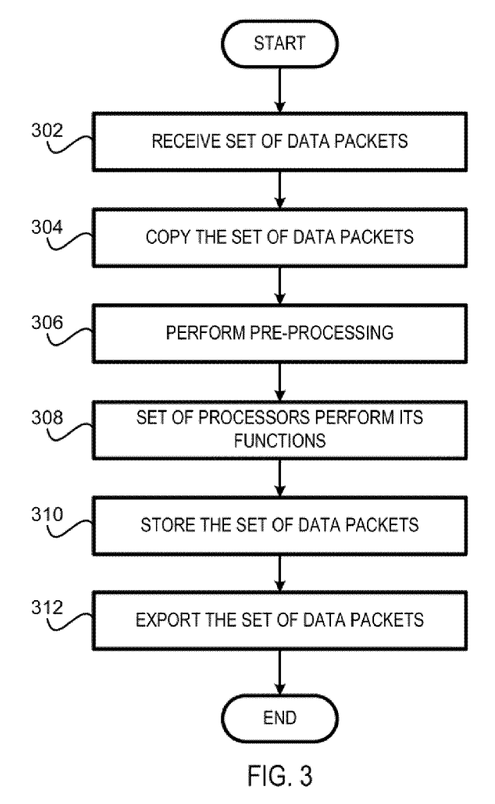
FIG. 3 shows, in an embodiment of the invention, a simple flow chart for managing incoming data traffic.

FIG. 3 shows, in an embodiment of the invention, a simple flow chart for managing incoming data traffic.

At a first step 302, a set of data packets is received by a time machine device.

At a next step 304, the set of data packets is copied by the time machine device. In other words, before the set of data packets is sent onward to the next network device, a copy of the set of data packets is made by the time machine device.

At a next step 306, pre-processing is performed. In an embodiment, if more than one data packets are received, the pre-processing module may aggregate the data packets into a single data stream. In another embodiment, the pre-processing module may perform some preliminary filtering. In an example, all data packets from a known bad IP address may be dropped.

Step 306 may be optional. Once pre-processing has been performed, the set of processors may perform its functions at a next step 308. In an embodiment, additional filtering may be performed on the copied set of data packets. In another embodiment, the set of data packets may be encrypted to prevent snooping.

Once the set of data packets have been filtered and/or encrypted, at a next step 310, the set of data packets may be stored within a storage memory component.

In an embodiment, the set of data packets may also be exported to external location, at a next step 312. In an example, at least a part of the data packets may be forwarded to a monitoring device. In another example, at least a part of the data packets may be forwarded off-site to a USB device. In yet another example, at least a part of the data packets may be forwarded to a SATA device.

Steps 310 and 312 are not dependent upon one another.

Figure 4:
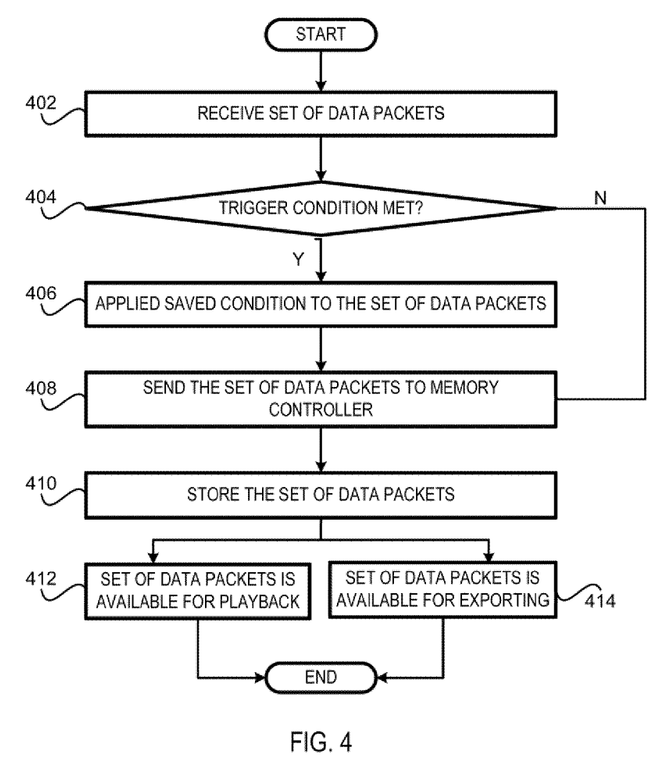
FIG. 4 shows, in an embodiment of the invention, a simple flow chart for managing performing storage and playback

FIG. 4 shows, in an embodiment of the invention, a simple flow chart for managing performing storage and playback At a first step 402, the set of data packets is received.

At a next step 404, the set of processors may make a determination if a set of trigger conditions has been met. If the set of trigger conditions has been met, then at a next step 406, the saved condition is applied to the set of data packets. In an example, all data packet with an email address from the accounting department is saved for six months. As can be appreciated from the foregoing, the set of trigger conditions may be employed to help determined the type of content to save and the duration for saving the content.

At a next step 408, the set of data packet which met the trigger conditions is forwarded to memory controller, which is configured for storing the set of data packets (step 410) in a storage memory component (such as a hard drive).

Referring back to step 404, if the set of trigger condition is not met, then the set of data packets is sent to the memory controller (408) and is stored within the storage memory component (410) at the standard duration time. As can be seen, in this example, the set of trigger conditions is employed to differentiate the duration for saving a data packets. However, the set of trigger condition may also be employed to determine what type of content is saved. For example, a trigger condition may be set where all personal emails are dropped.

Once stored, the data is available for playback (step 412). In an embodiment, playback may be a full playback or a partial playback based on a user's command. In an example, the user may have to analyze all stored data to determine the cause of virus within the company's network. In another example, the user may only want to analyze data from the last six months in determining network utilization from the accounting department.

In addition, the data is also available for exporting (step 414). All or portion of the copied data packets may be exported to one or more monitoring devices for analysis. Also, the data may also be exported to external drives for long-term storage and/or for off-site analysis, for example.

Figure 5:
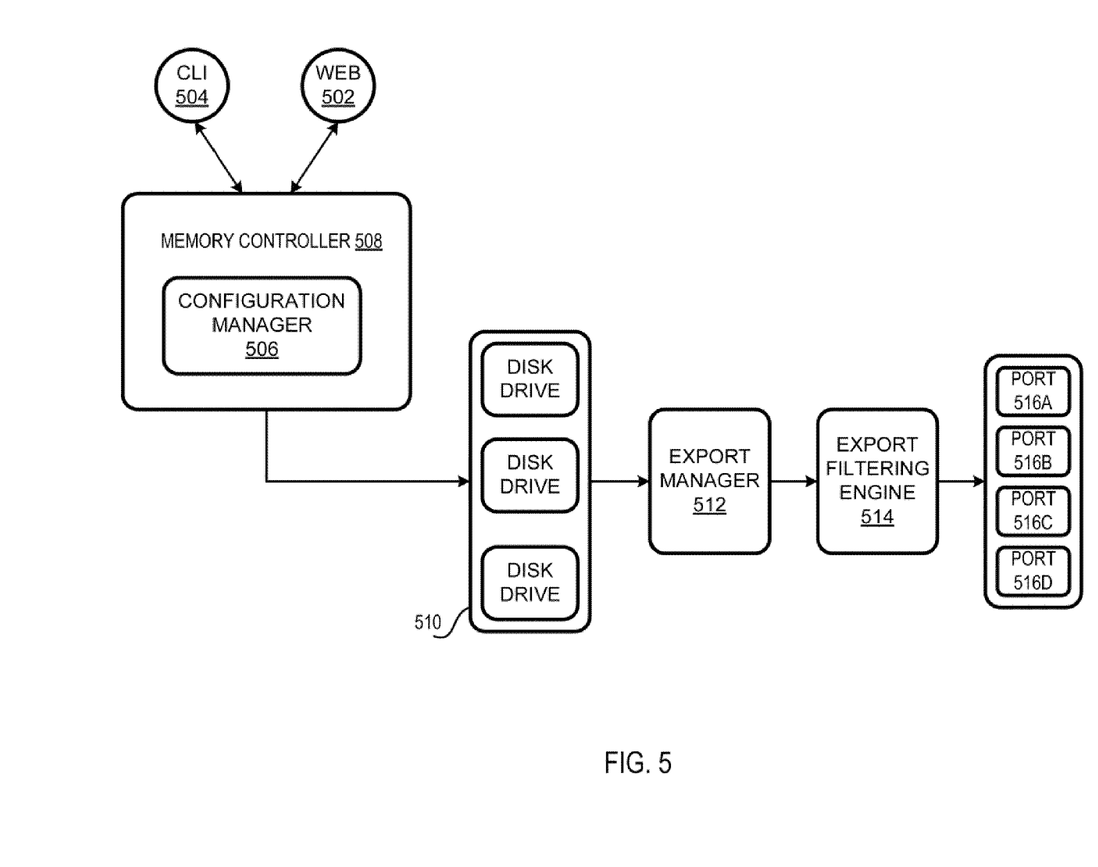
FIG. 5 shows, in an embodiment of the invention, a simple diagram illustrating an arrangement and/or method for exporting data packets from the time machine device.

FIG. 5 shows, in an embodiment of the invention, a simple diagram illustrating an arrangement and/or method for exporting data packets from the time machine device.

Command for exporting a set of data packets may be received through one of a web interface 502 or a command line interface 504. The interfaces (502 and 504) may be interacting with a configuration manager 506 of a memory controller 508. In an embodiment, configuration manager 506 may be configured to set up the rules on how the data is configured. In an embodiment, memory controller 508 is configured to set up the control for the storage memory components 510 (e.g., disk drives). By employing memory controller 508, problems that may occur to one or more disk drive may be handled while minimizing the impact to the time machine device. In an example, memory controller 508 may divert data packets away from a "bad" disk drive to the other disk drives while the 'bad' disk drive is being repaired and/or replaced.

In an embodiment, the time machine device may also include an export manager 512, the export manager may be part of the set of processors and may be configured to export the data through one of the ports (e.g., 516A, 516B, 516C, 516D, etc.). In an example, the data may be exported to one of the monitoring ports. In another example, the data may be exported to an external drive such as a SATA device or a USB device. In an embodiment, an export filtering engine 514 may be employed to perform additional filtering before the set of data packets is exported.

In an embodiment, the time machine may be applied in a high-speed Ethernet environment, such as a gigabit Ethernet, to establish a communication link between network devices. Usually, a communication link may be established between network devices. However, the direction of the data traffic between network devices is usually bidirectional and unpredictable.

In the prior art, each time a network tap experiences a power disruption, the path between the network devices may have to be renegotiated since the communication link is lost and a new communication link may have to be established. In an example, when the communication link is broken, a set of mechanical relays may be triggered to create a new path. Unfortunately, the time required to trigger the set of mechanical relays and to enable the two network devices to perform auto-negotiation may require a few milliseconds. The latency experienced during this time period may have dire financial consequences. In an example, in a financial industry, a latency of a few milliseconds can result in millions of dollars loss.

In an embodiment of the invention, the time machine may include a zero-delay arrangement for establishing an alternative path. In an embodiment, the zero-delay arrangement may include a sensor controller, which may be configured to monitor the power flowing into the tap. In an embodiment, the sensor controller may be configured to compare the power flowing into the time machine against a predefined threshold. If the power level is below a predefined threshold, then a set of capacitors may be employed to provide the temporary power source to the time machine to maintain the current communication link while a set of relays is establishing an alternative path (communication link) between the network devices. In an example, a direct communication path between the network devices (moving said set of relays from an opened position to a closed position) may be established when the current communication link is failing. Since the alternative path is established when the power drop is first detected and the communication link between the network devices has not yet been broken, no data packet loss is experienced. Thus, disruption to a company's network traffic may be substantially minimized, thereby, enabling the company to maintain its quality of service and limit its financial loss.

Figure 6A:
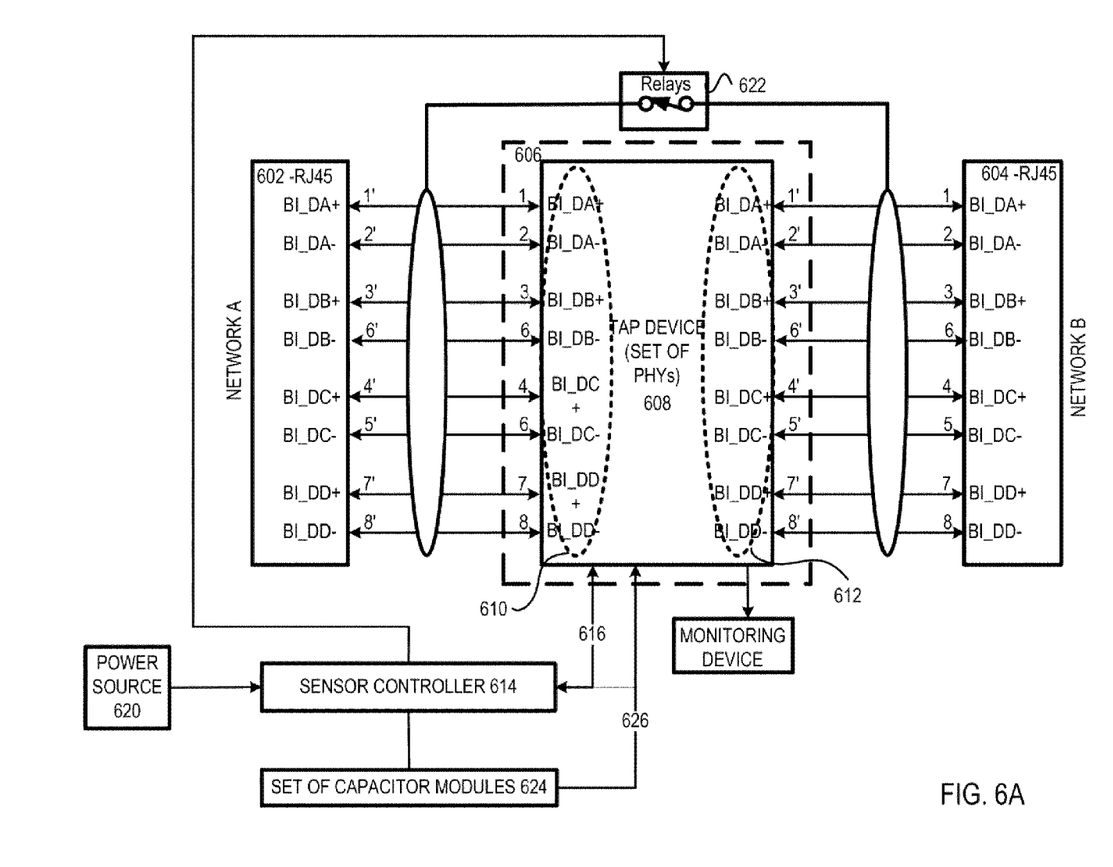
FIG. 6A shows, in an embodiment of the invention, a simple block diagram illustrating an arrangement for maintaining a link after a power disruption.

FIG. 6A shows, in an embodiment of the invention, a simple block diagram illustrating an arrangement for maintaining a link after a power disruption. Consider the situation wherein, for example, data traffic is flowing between two network devices, between a port 602 of Network A and a port 604 of Network B. Both port 602 and port 604 may be RJ45 jacks that support Ethernet over twisted pairs. To monitor the data traffic, a gigabit network tap (such as a time machine) 606 may be provided. As aforementioned, in order for network tap 606 to monitor the data traffic, a communication link may be established between network tap 606 and port 602 of Network A and network tap 606 and port 604 of Network B.

Those skilled in the art are aware that a gigabit network tap may include a set of PHYs for establishing communication links with the network devices. In an embodiment, when network tap 606 is first turn on, the master-slave mode of a set of PHYs 608 may be configured. In an embodiment, a sensor controller 614 may be employed to configure set of PHYs 608 via a path 616. In an example, side 610 of set of PHYs 608 may be set up in a master mode while side 612 of set of PHYs 608 may be set up in a slave mode. Once the master-slave mode has been established, network tap 606 may participate in auto-negotiation to establish a communication link with each of the network devices.

Since side 610 of set of PHYs has been set up in a master mode, port 602 of Network A may be set up in a slave mode. Likewise, since side 612 of set of PHYs has been set up in a slave mode, port 604 of Network B may be set up in a master mode. In an example, data traffic may flow from network twisted pair pins 1-2 of port 604 to tap twisted pair pins 3'-6' of side 612 of set of PHYs. The data traffic is then forwarded by tap twisted pair pins 1-2 of side 610 of set of PHYs 604 to network twisted pair pins 3'-6' side of port 602. In another example, data traffic may flow from network twisted pair pins 4-5 of port 604 to tap twisted pair pins 7'-8' of side 612 of set of PHYs. The data traffic is then forwarded by tap twisted pair pins 4-5 of side 610 of set of PHYs 604 to network twisted pair pins 7'-8' side of port 602.

In an embodiment, sensor controller 614 may also be configured to monitor the power level flowing to network tap 606. In an example, a primary power source 620 (such as a 12 volt power adaptor) may be available to provide power to network tap 606. Similar to FIG. 3, sensor controller 614 may be configured to compare the power level from primary power source 620 to a predefined threshold. If the power level falls below the predefined threshold, then sensor controller may switch a set of relays 622 from an opened position to a close position to create an alternative data path.

Figure 6B:
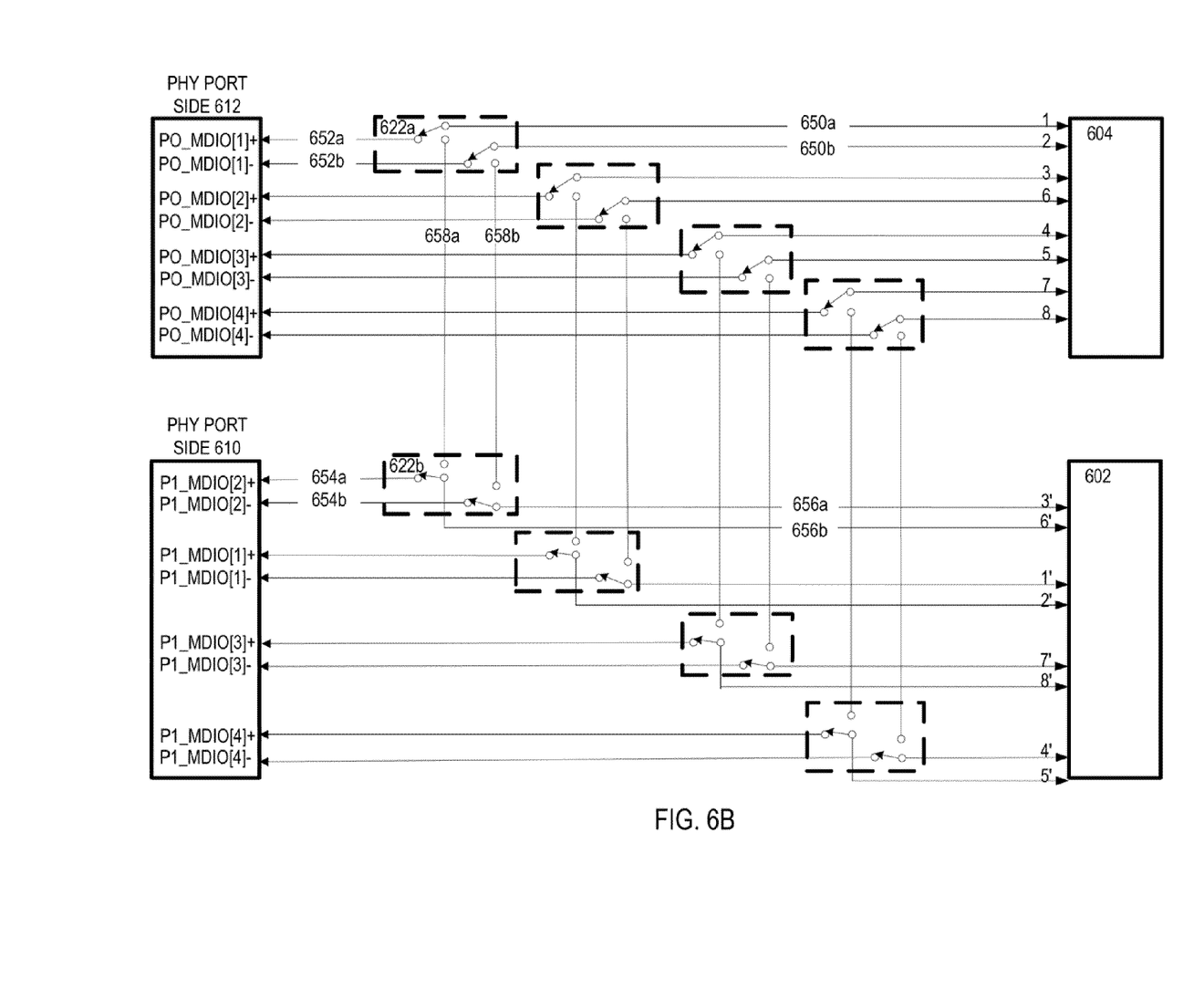
FIG. 6B shows, in an embodiment, examples of data paths between two network devices.

FIG. 6B shows, in an embodiment, examples of data paths between two network devices. In an example, data traffic may be flowing from port 604 (network twisted pair pins 1-2) through network tap 606 to port 602 (network twisted pair pins 3'-6'). In other words, data traffic may flow from network twisted pair pins 1-2 of port 604 through a relay 622a (paths 650a/650b) to tap twisted pair pins 3'-6' of side 612 of set of PHYs (paths 652a/652b). The data traffic is then forwarded by tap twisted pair pins 1-2 of side 610 of set of PHYs 604 through a relay 622b (paths 654a/654b) to network twisted pair pins 3'-6' side of port 602 (paths 656a/656b). However, when power disruption occurs, relay 622 may be switched to establish a set of alternative paths. In an example, instead of flowing through paths 652a/652b and paths 654a/654b, data traffic may be directed from relay 622a along paths 658a/658b to relay 622b (without going through network tap 606) before flowing onward to port 604 of Network B.

In an embodiment, auto-negotiation is not required to establish a new communication link. Since port 602 of Network A has been previously set up in a slave mode, for example, and port 604 of Network B has been previously set up in a master mode, for example, auto-negotiation is not required to set up a new communication link since the master-slave mode has already been defined and has not changed.

In the prior art, the set of relays may be activated to establish a new path after power has been loss. As a result, renegotiation is usually required to set up an alternative path between Network A and Network B. Unlike the prior art, the set of relays is activate by sensor controller 614 before the power disruption causes a power drop that is unable to maintain the current communication link, in an embodiment. In other words, the set of relays may be activated before all power has been lost. By creating an alternate path prior to loss of all power, an alternative path may be established while minimizing data loss. In an embodiment, a set of capacitor modules 624 may be employed to store a power source to provide sufficient power to network tap 606 (via a path 626) to maintain the current communication links while set of relays 622 is setting up an alternative path. In an embodiment, since the master-slave mode has already been established, auto-renegotiation is not necessary to establish a new communication link between the network devices.

In an embodiment, the set of relays is a modular component and may be removable. In an example, the set of relays may be connected to a set of PHYs via a set of sockets. Thus, the set of relays may be quickly connected and disconnected for maintenance.

Figure 7:
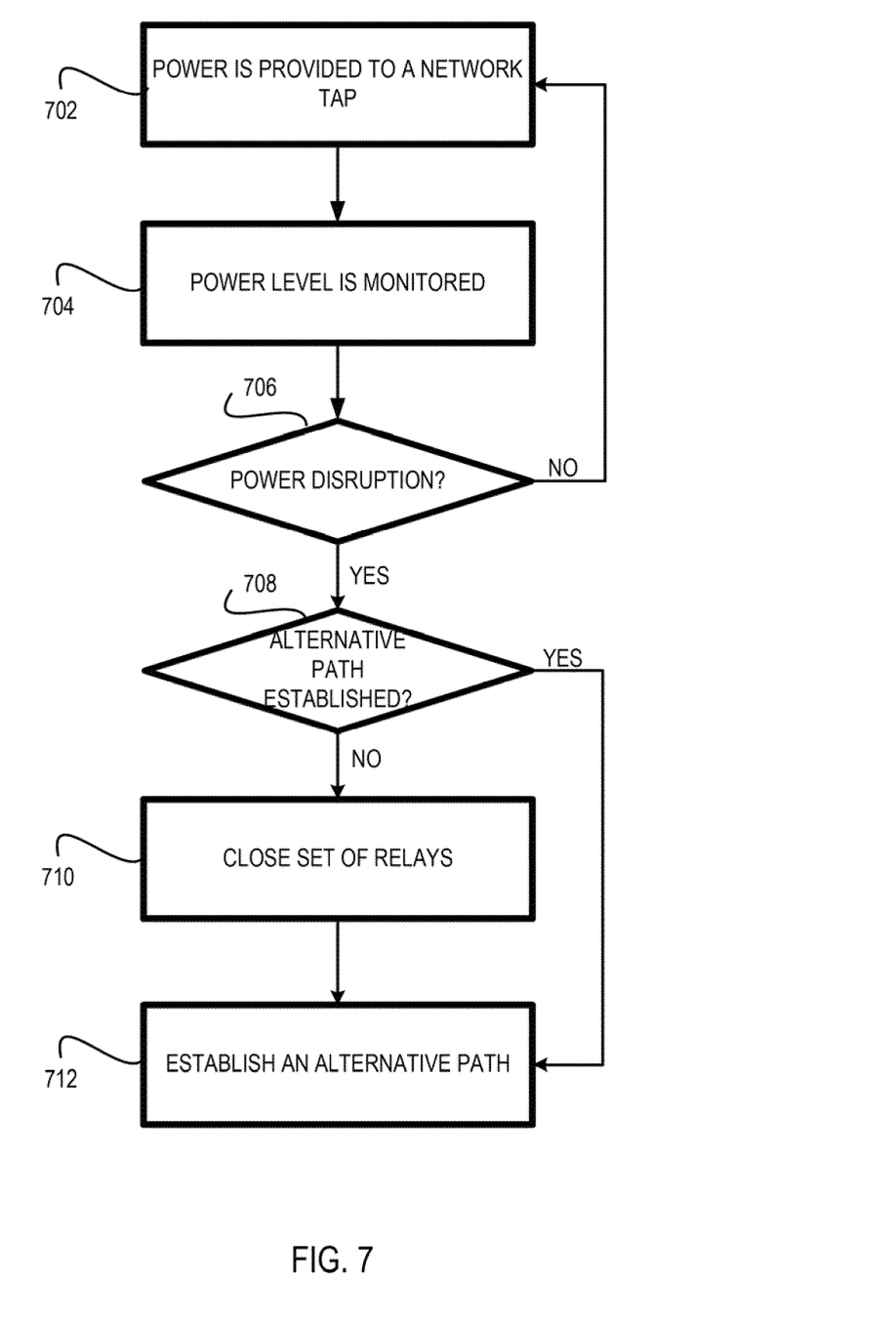
FIG. 7 shows, in an embodiment of the invention, a simple flow chart illustrating a method for maintaining a link after a power disruption in the primary power source has occurred.

FIG. 7 shows, in an embodiment of the invention, a simple flow chart illustrating a method for maintaining a link after a power disruption in the primary power source has occurred.

At a first step 702, power is provided to a network tap, which is configured to monitor data traffic flowing between two network devices. In an example, primary power source 620 is turned on.

At a next step 704, power level is monitored by a sensor controller. In an example, sensor controller 614 may be monitoring the power level flowing from primary power source 620 to network tap 606.

At a next step 706, the sensor controller determines if a power disruption has occurred. In an example, sensor controller 614 may be comparing the power level flowing from primary power source 620 against a predefined threshold. If the power level is above the predefined threshold, power continues to flow from primary power source (step 702).

However, if the power level is below the predefined threshold, the sensor controller may make a determination if an alternative path has already been established (step 708). In an example, if power is currently being flowing from primary power source 620, then an alternative path is not currently established. Thus, when sensor controller 614 makes a determination that a power drop has occurred, sensor controller 614 may close a set of relays to create an alternative path (step 710). In an embodiment of the invention, a set of capacitors may be available to provide a source of temporary power to network tap 606 in order to maintain the current communication link in order to provide set of relays 622 sufficient time to establish an alternative path for data traffic to flow between Network A and Network B (step 712).

However, if an alternative path has already been established, then the data traffic continues to flow through the alternative path (step 712).

As can be appreciated from FIGS. 6 and 7, an arrangement and methods are provided for maintaining a link when power disruption may occur causing the network tap to go offline. By monitoring the power level, an alternative path may be established to maintain the link between two network devices. Thus, even though the network tap may no longer be available to monitor the data traffic, an alternative data path may be established. As a result, financial losses that may be experienced due to latency delay may be minimized.

Figure 8:
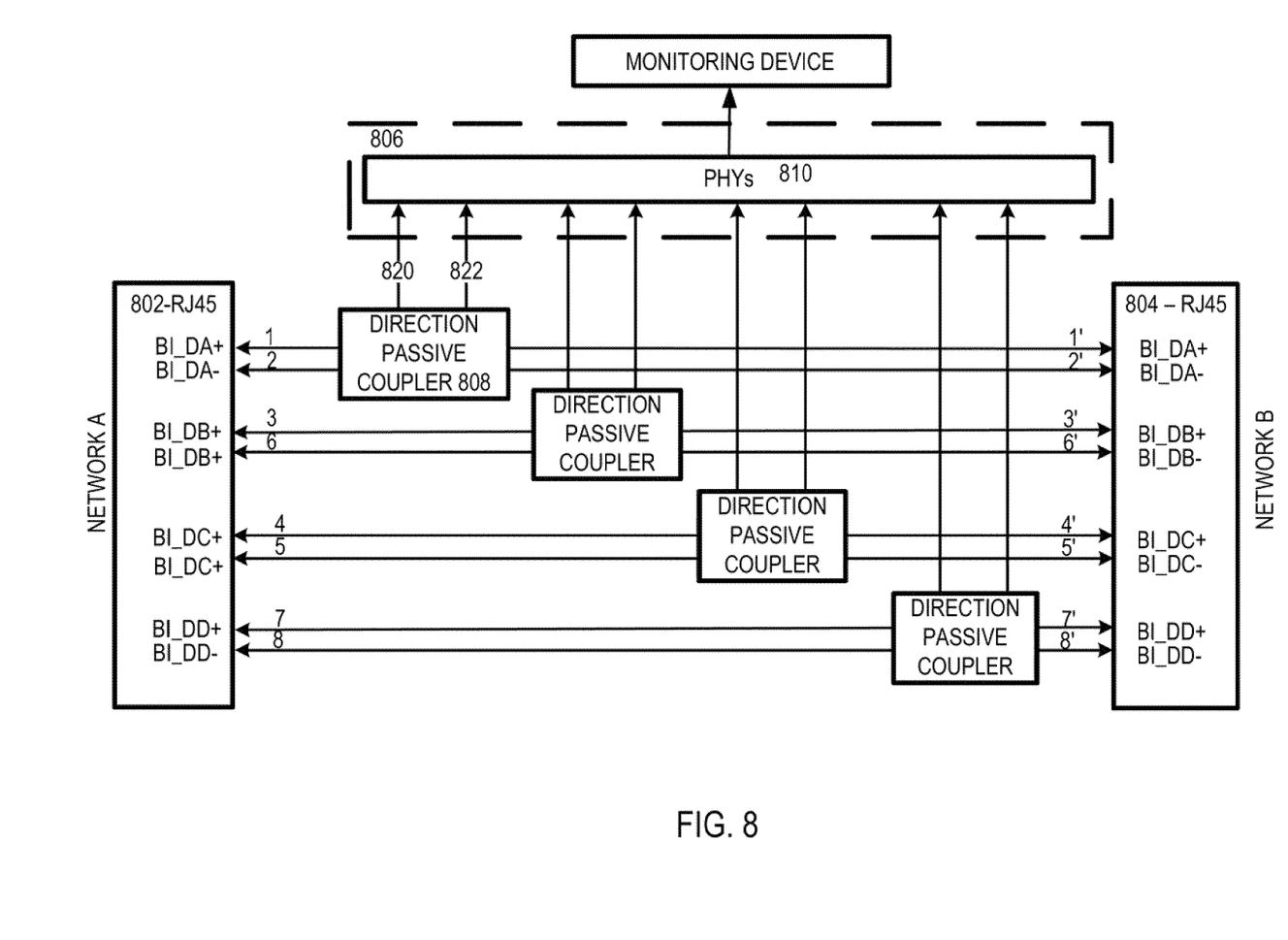
FIG. 8 shows, in an embodiment of the invention, a simple block diagram illustrating an arrangement for maintaining zero delay within a fast Ethernet environment.

FIG. 8 shows, in an embodiment of the invention, a simple block diagram illustrating an arrangement for maintaining zero delay within a fast Ethernet environment. Consider the situation wherein, for example, data traffic is flowing between two network devices, between a port 802 of Network A and a port 804 of Network B. Both port 802 and port 804 may be RJ45 jacks that support Ethernet over twisted pairs. To monitor the data traffic, a gigabit network tap 806 (such as a time machine) may be provided.

In an embodiment, a set of PHYs 810 may be configured to assign data traffic flowing from each specific twisted pair pins along a designated data path. In an embodiment, a set of direction passive couplers 808 may be employed to direct traffic to network tap 806 along the designated data paths. Set of direction passive couplers 808 may be configured to at least receive a copy of the data traffic, determine the direction of the data traffic and route the data traffic through a designated path. In an example, data traffic flowing from twisted pair pins 1-2 of port 802 may be directed by set of direction passive couplers 808 along a path 820. In another example, data traffic flowing from twisted pair pins 1'-2' of port 804 may be directed by set of direction passive couplers 808 along a path 822. Since data traffic is flowing into set of PHYs 810 along a designated path, set of PHYs 810 is able to route the data traffic onward to one or more monitoring devices.

As can be appreciated from FIG. 8, an arrangement is provided for providing zero delay in a faster Ethernet environment. Given that the inline set of direction passive couplers is passive and does not require power, the possibility of auto-negotiation due to power disruption is substantially eliminated. Thus, even if the network tap suffers power disruption, the power situation of the network tap does not affect the communication link between Network A and Network B.

Discussion about zero-delay arrangement is provided in a related application entitled "Gigabits Zero-Delay Tap and Methods Thereof," U.S. Application No. 61/308,981, filed on Feb. 28, 2010, by inventors Matityahu et al., all of which is incorporated herein by reference.

As can be appreciated from the forgoing, one or more embodiments of the present invention provide for a time machine device for managing data traffic through a network. With a time machine device, data are stored at a line rate thereby enabling data to be readily available for analysis. By providing for playback, data may be extracted and analyzed at a later data. Further, time machine device provides for the data to be forwarded to other media type.

While this invention has been described in terms of several preferred embodiments, there are alterations, permutations, and equivalents, which fall within the scope of this invention. Although various examples are provided herein, it is intended that these examples be illustrative and not limiting with respect to the invention.

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A time machine arrangement for performing health check on a network environment, comprising:
   a set of network ports, said set of network ports including a set of input network ports for receiving data traffic and a set of output network ports for outputting said data traffic from said time machine arrangement;
   a monitoring port, said monitoring port being configured to receive at least a portion of said data traffic flowing through said network environment;
   a set of processors configured at least for managing and analyzing said data traffic, wherein said set of processors including
   a scheduler component configured for directing said data traffic to and redirecting said data traffic between said set of processors,
   a filtering component configured for applying a set of filters on said data traffic,
   an encryption component configured for encrypting said data traffic, and
   a trigger component configured for defining a set of conditions for storing said data traffic; and
   a storage memory component configured for storing a copy of at least said portion of said data traffic received from said monitoring port and flowing through said network environment to a monitoring device.

2. The time machine arrangement of claim 1 wherein said scheduler component is configured to direct said data traffic based on a percentage rule, wherein each processor of said set of processors is configured to handle a percentage of said data traffic.

3. The time machine arrangement of claim 2 wherein said scheduler component is configured for redirecting a first set of data packets flowing to a first processor of said set of processors if said first processor is not available to perform processing.

4. The time machine arrangement of claim 1 wherein said trigger component is configurable, thereby enabling said set of conditions to be configured to a user's specification.

5. The time machine arrangement of claim 1 wherein said filtering component being configured for performing one of ingress filtering, egress filtering, and deep packet inspection.

6. The time machine arrangement of claim 1 wherein said storage memory component includes
   a set of memory devices configured for storing said data traffic, and
   a memory controller configured at least for managing the flow of said data traffic to said set of memory devices.

7. The time machine arrangement of claim 6 wherein said memory controller is configured for redirecting said flow of said data traffic when a first memory device of said set of memory devices is inaccessible.

8. The time machine arrangement of claim 6 wherein a time stamp is added to each data packet of said data traffic before storing said each data packet in one of said set of memory devices.

9. The time machine arrangement of claim 1 further including a pre-processing module configured for performing preliminary analysis on said data traffic flowing through said network environment.

10. The time machine arrangement of claim 9 wherein said pre-processing module includes an aggregating component configured for combining plurality of data packets flowing through said set of input network ports into a single data stream.

11. The time machine arrangement of claim 9 wherein said pre-processing module includes a filtering component configured for performing simple filtering functionalities on said data traffic flowing through said network environment.

12. The time machine arrangement of claim 9 wherein said pre-processing module is a field-programmable gate array.

13. The time machine arrangement of claim 9 wherein said pre-processing module is configured for performing packet ordering and time stamp.

14. The time machine arrangement of claim 1 further including a playback feature, said playback feature enabling at least part of said data traffic to be accessed at a later time period.

15. The time machine arrangement of claim 1 wherein said time machine arrangement is a high-speed network device configured for monitoring said data traffic flowing through said network, wherein said time machine arrangement includes
   a primary power source for providing a first power to circuitry of said time machine arrangement, and a sensor controller configured for at least one of
- monitoring power flowing into said time machine arrangement,
- determining when said power is below a predefined threshold,
- activating a set of capacitor modules to provide temporary power to said time machine arrangement when said power is below said predefined threshold, and
- switching a set of relays from an opened position to a closed position to establish an alternative communication link between said input and output network ports.

\* \* \* \* \*